United States Patent
Comish et al.

(10) Patent No.: US 11,347,867 B2
(45) Date of Patent: May 31, 2022

(54) METHODS AND APPARATUSES TO EVALUATE CYBER SECURITY RISK BY ESTABLISHING A PROBABILITY OF A CYBER-ATTACK BEING SUCCESSFUL

(71) Applicant: NEHEMIAH SECURITY, INC., Tyson's Corner, VA (US)

(72) Inventors: Richard Comish, Tyson's Corner, VA (US); Gerald Caponera, Tyson's Corner, VA (US)

(73) Assignee: NS Holdings LLC, Arlington, VA (US)

( * ) Notice: Subject to any disclaimer, the term of this patent is extended or adjusted under 35 U.S.C. 154(b) by 0 days.

(21) Appl. No.: 17/056,659

(22) PCT Filed: May 17, 2019

(86) PCT No.: PCT/US2019/032921
§ 371 (c)(1),
(2) Date: Nov. 18, 2020

(87) PCT Pub. No.: WO2019/222662
PCT Pub. Date: Nov. 21, 2019

(65) Prior Publication Data
US 2021/0248240 A1    Aug. 12, 2021

Related U.S. Application Data

(60) Provisional application No. 62/673,637, filed on May 18, 2018.

(51) Int. Cl.
G06F 21/55 (2013.01)
G06F 21/56 (2013.01)
G06F 21/57 (2013.01)

(52) U.S. Cl.
CPC .......... *G06F 21/577* (2013.01); *G06F 21/554* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,591,006 B2 * | 3/2017 | Siva Kumar | H04L 63/083 |
| 10,270,798 B2 | 4/2019 | Zaffarano et al. | |
| 10,454,950 B1 * | 10/2019 | Aziz | H04L 63/1441 |
| 2012/0216282 A1 | 8/2012 | Pappu et al. | |
| 2013/0227697 A1 | 8/2013 | Zandani | |
| 2015/0381649 A1 | 12/2015 | Schultz et al. | |

(Continued)

*Primary Examiner* — Fatoumata Traore
(74) *Attorney, Agent, or Firm* — Faegre Drinker Biddle & Reath LLP

(57) ABSTRACT

A method performed on a processor to determine a probability of success of a cyber-attack on a target network such that the defenses of the target network may be evaluated is provided. The method includes (1) calculating a probability that the cyber-attack will successfully ingress to the target network; (2) calculating a probability that the cyber-attack will successfully move laterally in the target network by performing an action; (3) calculating a probability that the cyber-attack will successfully perform an action on objective. The calculated probabilities are combined to determine a probability that the cyber-attack will be successful such that the defenses of the target network may be evaluated.

8 Claims, 6 Drawing Sheets

(56) References Cited

U.S. PATENT DOCUMENTS

| | | | |
|---|---|---|---|
| 2016/0065601 A1* | 3/2016 | Gong | H04L 63/1416 |
| | | | 726/23 |
| 2016/0205122 A1* | 7/2016 | Bassett | G06F 21/577 |
| | | | 726/23 |
| 2017/0006055 A1 | 1/2017 | Strom et al. | |
| 2017/0063911 A1 | 3/2017 | Muddu et al. | |
| 2017/0126717 A1 | 5/2017 | Siva Kumar et al. | |
| 2018/0004948 A1* | 1/2018 | Martin | G06F 21/552 |
| 2018/0219905 A1* | 8/2018 | Gorodissky | H04L 63/30 |

* cited by examiner

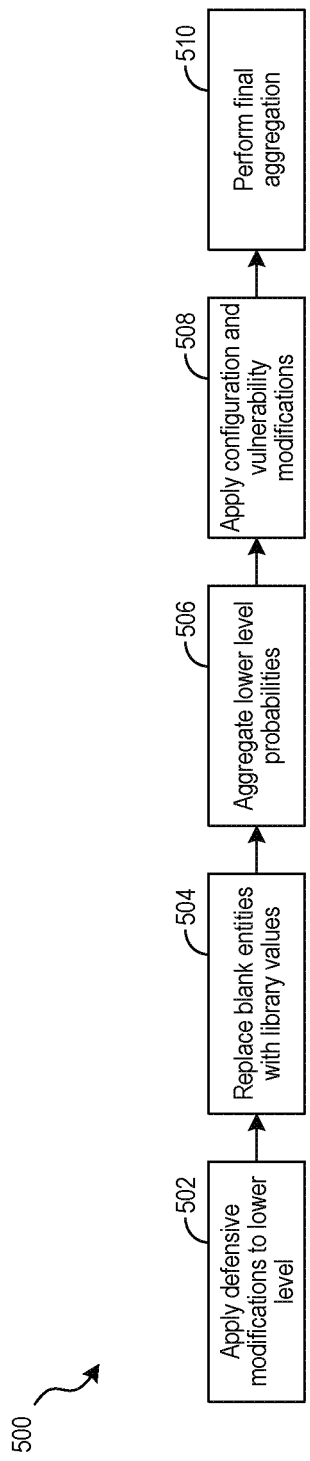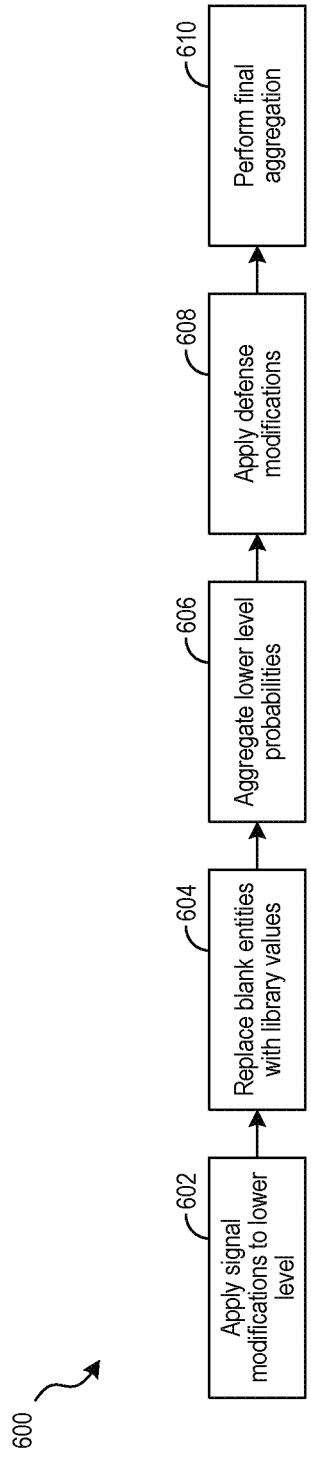

METHODS AND APPARATUSES TO EVALUATE CYBER SECURITY RISK BY ESTABLISHING A PROBABILITY OF A CYBER-ATTACK BEING SUCCESSFUL

CROSS-REFERENCE TO RELATED PATENT APPLICATIONS

The present application claims priority to U.S. Provisional Patent Application Ser. No. 62/673,637, filed May 18, 2018, titled Business Impact Analysis Engine for a Cyber Security Evaluation System, the disclosure of which is incorporated herein for all purposes as if set out in full.

U.S. patent application Ser. No. 15/286,990, filed Oct. 6, 2016, titled, Assessing Effectiveness of Cybersecurity Technologies, is incorporated herein by reference for all purposes as if set out in full.

BACKGROUND

Cyber security or computer security refers, generally, to the body of technologies that protect individual computers as well as networks of computers from attacks, theft, disruption, misdirection, damage, and the like. The technologies may be a combination of processes, practices, training, software modules, hardware modules, firmware or the like. The technologies may be static and/or dynamic technologies.

The types of attacks, which are everchanging and evolving, include backdoors, denial of service (DoS), denial of access, spoofing, eavesdropping, phishing, tampering, to name but a few types of attacks. Cyber security systems generally function well to protect systems from the various types of attacks, but cyber-attacks continue, and they are successful as shown by any one of numerous data breaches that occur with some regularity.

Cyber security, as mentioned above, provides a variety of technologies that are defensive and offensive cyber security to protect computers, processes, data, memory, networks, etc., which may generically be referred to as "computer systems". Some of the cyber security technologies foreclose certain attack opportunities whereas others mitigate against the attack and/or damage that results from the attack. Cyber security may include hardware modules (such as a crypto processing unit, firewall, etc.), software modules (such as an antivirus database, intrusion detection systems, etc.), firmware (such as updates and security patches), access controls, employee training, and the like to name but a few options.

While the technologies exist, and are, for the most part, robust as well as effective, every company wants to evaluate how secure the computer system is with respect to a plethora of known and, in some cases, unknown or random attacks and events. Additionally, the companies want to know whether to improve, change, or implement new cyber security measures, which may be as simple as redoubling training for employees to implementing system with security measures.

One of the most difficult determinations for evaluating technology is the probability of any particular cyber-attack being a successful cyber-attack. Discovering the probability of a successful attack on a specific network configuration is a problem that faces many security companies and has significant technical challenges due to the inherent complexity of figuring out what the attacker does. Thus, against this background, the technology of the present application allows a reduction in the number of components in specific attacks to a manageable level and has a mechanism for handling the potentially unbounded set of lateral movements that an attacker might undertake whilst enacting the details of their attack.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a method performed on a processor to determine a probability of success of a cyber-attack on a target network such that the defenses of the target network may be evaluated. The method includes (1) calculating a probability that the cyber-attack will successfully ingress to the target network; (2) calculating a probability that the cyber-attack will successfully move laterally in the target network by performing an action; (3) calculating a probability that the cyber-attack will successfully perform an action on objective. The calculated probabilities are combined to determine a probability that the cyber-attack will be successful such that the defenses of the target network may be evaluated.

In some embodiments, a method performed on a processor to determine a probability of success of a cyber-attack on a target network such that the defenses of the target network may be evaluated is provided. The method is an iterative method and includes: (a) identifying a configuration state of the target network; (b) constructing a database of a plurality of actions available to the cyber-attack; (c) allocating a plurality of windows that correspond to the plurality of actions available to the cyber-attack, wherein a total number of windows for the plurality of windows is a defined number for the configuration state(s) of the target network; (d) generating a random number between 1 and the defined number; (e) identifying a window of the plurality of windows that is equal to the random number; (f) following a path indicated by an action of the plurality of actions that corresponds to the window to move the target network to a new configuration state; (g) calculating a defense signal level for the target network; (h) based on the defense signal level, adjusting a state of the defense for the target network; (i) calculating the probability that the cyber-attack is viable; (j) determining whether the action on objective has been reached and, if the action on objective has been reached the cyber-attack is successful; (k) if it is determined the action on object has not been reached, determining whether the probability that the cyber-attack is viable is zero and, if the probability that the cyber-attack is viable is zero the cyber-attack has failed; (l) if it is determined that the probability that the cyber-attack is viable is not zero, determining whether a state of the defense for the target network is at an evidence of an attack detected state and, if the state of the defense for the target network is at the evidence of the attack detected state the cyber-attack has failed; (m) if it is determined that the state of the defense for the target network is not at the evidence of the attack detected state, determining if the maximum number of iterations has been reached and, if the maximum number of iterations has been reached the cyber-attack has failed; and if it is determined that the maximum number of iterations has not been reached, repeating steps (a)-(m) such that the probability of success of the cyber-attack is a ratio between number of times the cyber-attack is successful against a total number of simulations These and other aspects of the present system and method will be apparent after consideration of the Detailed Description and Figures herein.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

FIG. 5 shows an exemplary flow diagram of a probability of success determination consistent with the technology of the present application.

FIG. 6 shows an exemplary flow diagram of a probability of defense determination consistent with the technology of the present application.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As mentioned above, when attempting to calculate the overall risk of a cyber-attack inflicting damage on an organization, an important factor in this is having a measure of how likely a given attack is to succeed against the infrastructure and defenses that the company's network employs to defend against intruders. The technology of the present application provides a model to calculate a probability that a set of attacks will succeed against a target network that considers both the attacker's characteristics (for example motive, resources, and skill level) and the target network's defenses against the attackers.

A cyber-attack may be considered as a graph of Actions that the attacker performs to achieve their objectives. The Actions are similar to states in a state machine diagram. These Actions may be tactics, techniques and procedures (TTPs) strung together by the attacker to achieve their objectives.

The taxonomy TTPs may be aligned with a standard framework, such as the ATT&CK frameworks by the Mitre Corporation (Mitre Corporation, n.d.) (Pre ATT&CK, ATT&CK Enterprise, etc)—although this could be aligned with other taxonomies such as the Lockheed Martin Kill Chain (Lockheed Martin, n.d.).

This mechanism works well when performing a forensic analysis of an attack that has occurred in the real world. If it was possible to monitor everything about an IT environment for the duration of an attack, indicators of what was happening could certainly be found and pieced together into a path that the attacker took through the network to reach their objective(s). The mechanism is less robust for application to hypothetical or un-executed attack plans.

Figure 1A:
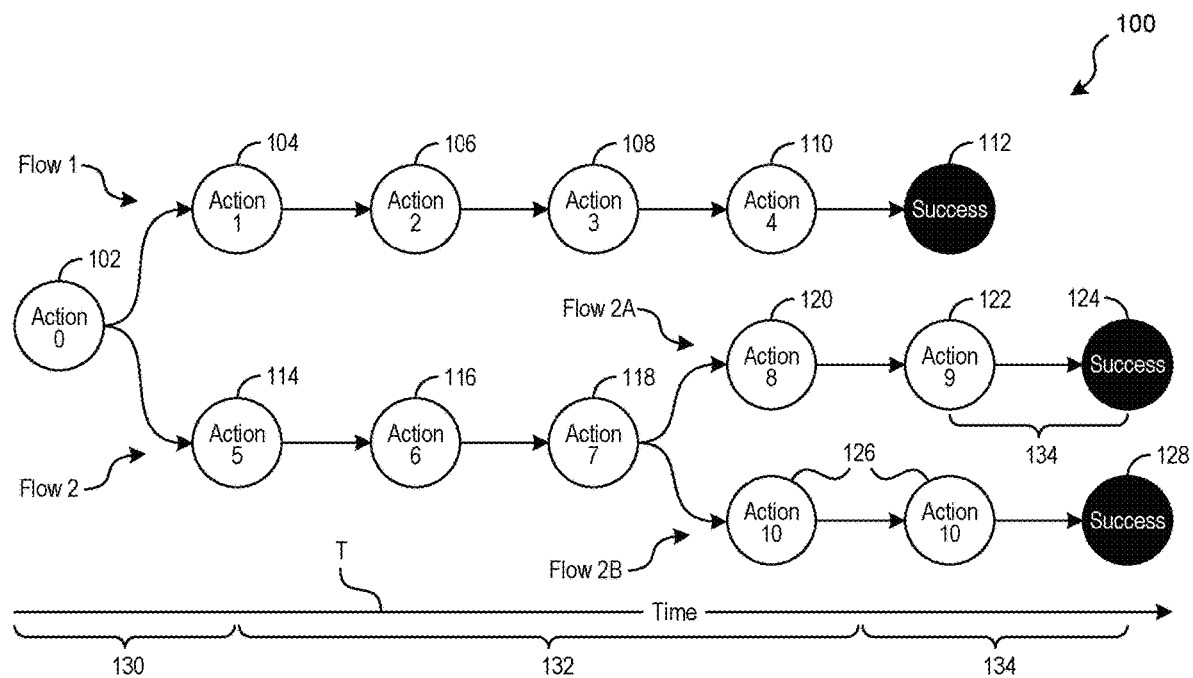
FIGS. 1A and 1B are illustrations of an exemplary cyber-attack consistent with the technology of the present application.

FIG. 1A shows an exemplary cyber-attack 100 in a graphical or state schema. The cyber-attack 100 corresponds to the attackers actions and TTPs. First, the attacker performs Action 0 (102), which results in two flows. Flow 1 includes Actions 1, 2, 3, and 4 (104, 106, 108, 110) to what would be a successful attack or success state 112. Flow 2 includes Actions 5, 6, and 7 (114, 116, 118) and results in two more flows. Flow 2A includes actions 8 and 9 (120, 122) to what would be a successful attack or success state 124. Flow 2B includes action 10 (126) to what would be a successful attack or success state 128. Success here simply indicates the attacker reached the desired objective. As shown by the time arrow T, the Actions 1-10 occur somewhat sequentially although Action 7, in this exemplary embodiment, can, in some instances, occur before Action 3. As will be explained, the technology of the present application generally works on time intervals or ticks of a clock where each time interval or tick results in an action and a response, potentially. Notice, while FIG. 1A (and 1B) terminate in success, not all cyber-attacks terminate in success.

Figure 1B:
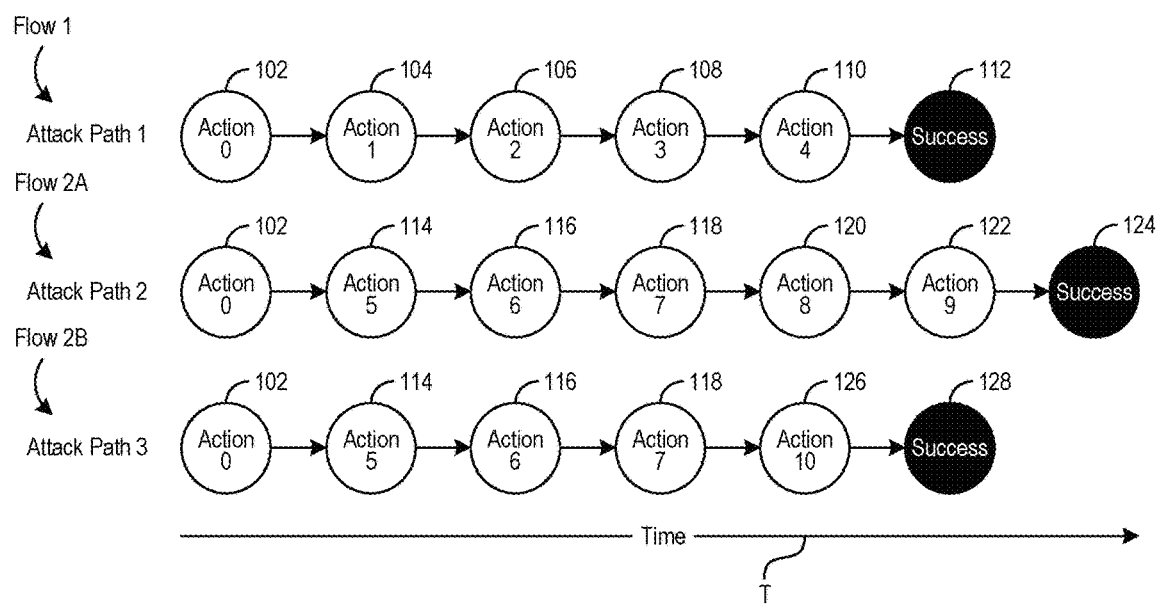

FIG. 1B shows the exemplary cyber-attack 100 but Flows 1, 2/2A, and 2/2B are broken out into independent graphics or schemata. Notice the time arrow T is simply to determine an order of actions or movement of time. For purposes of the technology described herein, it is beneficial to consider that each time interval or tick of a clock includes an Action, such as Actions 104, 106, 108, 110, 114, 116, 118, and 126.

While FIGS. 1A and 1B show simple attack paths to an eventual success state, the reality is that when dealing with the realm of possible attacks, the problem of combinatorial Actions and states explode quickly. Because of the combinatorial issues, attack path modelling using various mathematical approaches have found that scaling approaches quickly outpaces available computation power. As an example, various techniques in (Nair & Abraham, 2015) explored and categorized into their computational complexity using 'Big O' notation:

TABLE 1

| TOOLKIT NAME | COMPLEXITY | OPEN SOURCE | DEVELOPER |
|---|---|---|---|
| MULVAL | $O(n^2) \sim O(n^3)$ | Yes | Kansas State University |
| TVA | $O(n^2)$ | No | Georg Mason University |
| CAULDRON | $O(n^2)$ | No | Commercial |
| NETSPA | $O(n\log n)$ | No | MIT |
| FIREMON | $O(n\log n)$ | No | Commercial |

These levels of complexity stand, even though many of these approaches consider a subset of the facets of the network that make up the available mechanisms for an attack, for example, a common simplification is to simply consider software vulnerabilities by using an established taxonomy and ranking metric such as CVE and CVSS scores.

The technology of the present application, for the first time, models the attack phases for each of the flows 1, 2/2A, and 2/2B as three distinct phases of the cyber-attach. The phases include the initial ingress phase, where the attacker gains a foothold in the target network, which may be Action 0 (102) to Action 1 (104) or Action 5 (114) above. The initial ingress is followed by the lateral movement phase. In the lateral movement phase, the attacker moves through the network gaining an understanding of the network layout, credentials, digital assets, and other artifacts and configuration information to facilitate the attacker reaching the successful attack state. The final phase is the action on objective phase in which the attacker performs the ultimate objective of the attack, which is indicative of the success state. With reference to flow 1 in FIG. 1B, the initial ingress phase 130 is followed by the lateral movement phase 132 and the action on objective phase 134, which is Action 4, 9, or 10 (110, 122, 126) that terminates in the success state 112, 124, or 128.

In certain embodiments, multi-stage attacks may be determined. Multi-stage attacks are addressed by the technology of the present application as a new attack path or flow where the resumption of the attack is considered a new initial ingress. The initial ingress action is to resume access, which carries a probability of success of 1 as the attacker already has access. The attack paths or flows could be joined to other chains, but to reduce the complexity of the calculations, the present technology is described by deliberately considering them separate, although chaining the multiple stage attack is within the scope of the present technology.

Having separated the cyber-attack into multiple flows or paths with distinct phases, the probability of an attack path succeeding may be determined by equation 1:

$$P(S_{attack}) = P(S_{ingress}) \times P(S_{lateral|ingress}) \times P(S_{ao|ingress,lateral}) \quad (1)$$

As can be appreciated, the probability of a successful attack starts with the probability of a successful initial ingress phase. The probability of a successful lateral movement phrase is dependent, in part, on whether the ingress was successful and the probability of a successful action on objective phase is dependent, in part, on a successful ingress and a successful lateral movement. However, for purposes of the present technology, the dependent probabilities can be removed to reduce complexity. Thus, as shown in equation 2, the probability of a successful attack may be expressed equation 2:

$$P(S_{attack}) = P(S_{ingress}) \times P(S_{lateral}) \times P(S_{ao}) \quad (2)$$

$P(S_{attack})$ is the probability of a successful cyber-attack. $P(S_{ingress})$ is the probability of successful ingress action. $P(S_{lateral})$ is the probability of successful lateral action. $P(S_{ao})$ is the probability of successful action on objective. As can be appreciated by the flow diagrams of FIGS. 1A and 1B, and the equations 1 and 2, the combinatorial explosion for processor capacity relates to calculation of the probability of success during the lateral movement phase. Calculating the probability of successful later action is, at best, difficult due to a number of reasons that include: (1) the number of possible actions that an attacker can perform when considered at a granular level, which level scales dramatically based on the size of the network being attacked; (2) without a full simulation of the network being attacked (which is often impractical in itself), modelling the nuance of the network under attack is virtually impossible due to errors; (3) lateral movement in the network being attacked is unconstrained; and (4) the types of lateral actions available to a cyber-attacker change and develop over time.

Figure 2:
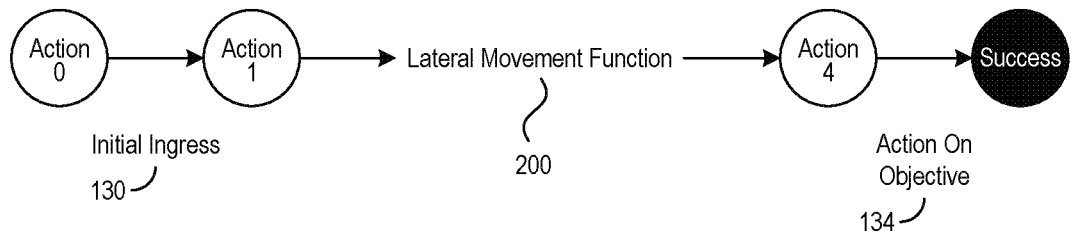
FIG. 2 is an illustration of an exemplary cyber-attack consistent with the technology of the present application.

To address these limitations, our model breaks the attack down into the three stages, and treats them thus: the initial ingress action is a sequence of actions as previously described, lateral action is a function that describes the overall probability that the attacker will succeed in lateral movement while only considering a statistically significant portion of the actions that an attacker might perform, and action on objective is considered as a sequence of actions as previously described. Therefore, the cyber-attack flow diagram to describe the overall mechanism of computation is as shown in FIG. 2. As shown in FIG. 2, the initial ingress phase 130 remains as described above and, similarly, the action on objective phase 134 remains the same as described above. The lateral movement phase 132, however, is replaced by a lateral movement function 200. The lateral movement function, as just mentioned, is a function that describes the overall probability that the attacker will succeed in lateral movement while only considering a statistically significant portion of the actions that an attacker might perform.

Equation 2, for example, may now be written by substituting the lateral movement function for the probability of successful lateral actions, which results in equation 3:

$$P(S_{attack}) = P(S_{ingress}) \times f_{lateral}(\ldots) \times P(S_{ao}) \quad (3)$$

The $f_{lateral}(\ldots)$, which will be explained further below, is the lateral movement function. Equation 3, however, may be further defined. In particular, the probability of a successful ingress is defined by the probability of success of Action 0 and the probability of success of Action 1. Similarly, the probability of a successful action on objective is the same as the probability of successful Action 4 (according to FIG. 2). Thus, equation 3 may be written as shown in equation 4:

$$P(S_{attach}) = P(S_{A0}) \times P(S_{A1}) \times f_{lateral}(\ldots) \times P(S_{A4}) \quad (4)$$

Lateral Movement Function

The lateral movement function, in certain embodiments, has the following properties:

The lateral movement function may consider each of the types of actions that an attacker might perform when moving laterally.

The lateral movement function may consider an increasing confidence level in the ability of the attacker to succeed in their lateral movement as they move through the network. More simply put, this states that there is a higher probability of success for a subsequent lateral action because the attacker has success in the previous lateral action.

The lateral movement function may be able to factor in the characteristics of the target network, for example, size, defensive characteristics.

The following properties may be translated into functional terms for a model such as, for example:

- A term that describes the probability of success of the attacker given a particular action.
- A term that weights the probability of successive actions, representing our increasing confidence that the attackers have successfully performed the previous actions.
- A term that describes the probability that the network will detect, and therefore the attack will be found and remediated.
- A term that supports a number of 'iterations' that an attacker must go through to be in a position to execute their action on objective stage.
- A term that represents the increasing probability that the attack will be discovered and halted as the attack goes on longer.

Put in equation form, equation 5 s that fulfil the following properties:

$$f_{lateral} = \Pi_{n=0}^{iterations} \Pi_j^{stages}((P(S_j)+(1-P(S_j))\times f_d(n))\times((1-P(d_j)\times f_a(n)))) \quad (5)$$

Where:
- j represents each stage of the attack—which may be at either the tactic, technique or procedure level of fidelity.
- n represents the iteration that the attacker is going through to move laterally.
- $f_d(n)$ is a damping function that represents our increasing confidence in the attackers' capabilities by the $n^{th}$ iteration.
- $P(S_j)$ is the probability that a given Action will succeed.
- $P(d_j)$ is the probability that the network's defences will detect the Action for the $j^{th}$ stage in the $n^{th}$ iteration.
- $F_a(n)$ is an amplification function that represents our increasing confidence that the network defense will detect and stop the attack.

We may determine the number of Iterations by use of metrics on the target network that may include:

- The number of endpoints in the network.
- The level of compartmentalization of the network.
- The proximity of the entry point to the network to the target that the attacker is attempting to reach.
- The diversity of permissions across user accounts in the network.
- The number of user accounts in the network.

Figure 3:
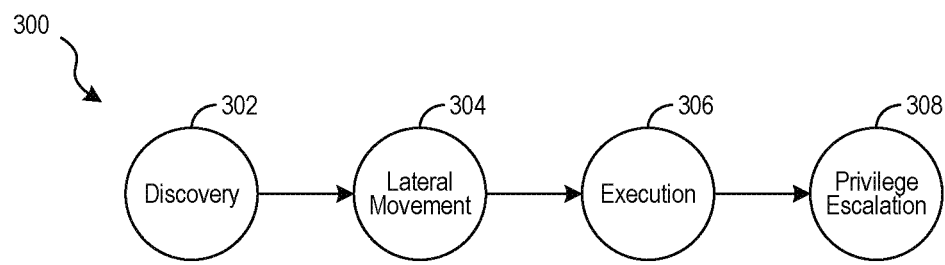
FIG. 3 is an exemplary group of actions representative of an exemplary cyber-attack consistent with the technology of the present application.

The stages of the iteration as identified above represent the groups of actions that the attacker may take during the lateral movement phase, which will be incorporated by the lateral movement function. In one simple aspect, the groups of action may be considered to be a set of tactics that the attacker must go through to move laterally. Using an exemplary Mitre ATT&CK, the group of actions may be exemplified as shown in FIG. 3. As shown in FIG. 3, the example provides for a discovery step 302, a lateral movement step 304, an execution step 306, and a privilege escalation step 308, as are generally understood and not further explained herein. Although FIG. 3 shows a very simple sequence 300, it illustrates one level at which the present technology may operate. It is possible to operate at both lower and higher levels, and sometimes desirable given the state of the model's knowledge about both the attacker and the defenses of the network. In general, the more knowledge regarding the attacker and/or the defenses of the network, the more granular and low level an abstraction can be used as would be now appreciated.

As an attacker progresses through a network, two countervailing forces occur that may be considered an amplification function and a damping function.

The amplification and damping functions are meant to represent a growing confidence in either the attacker's capabilities (damping—i.e. reducing a compound probability's tendency to go to 0 with more iterations) and the defense's likelihood to detect and stop the attack (amplification—i.e. making it more likely that the attack will be detected as more iterations are performed). The damping function may be represented by equation 6:

$$\lim_{x \to \infty} f_d(x) = 0 \quad (6)$$

Also, the amplification function may be represented by equation 7:

$$\lim_{x \to \infty} f_a(x) = 1 \quad (7)$$

Figure 4:
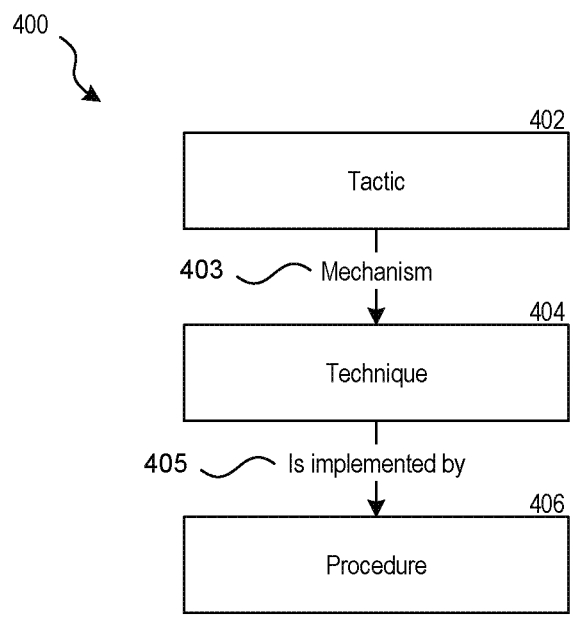
FIG. 4 shows an exemplary flow diagram of tactics, techniques, and procedures consistent with the technology of the present application.

Simple examples of such functions would be the sigmoid function or simple arithmetic manipulations of any logarithmic function The lateral movement function considers actions (such as Actions 0, 1, 4, 7, etc) as a generic form, which is indicative of something that the attacker might perform. To align with the concepts in a standard taxonomy, the exemplary actions may be tactics, techniques or procedures consistent with our exemplary attack outline and depending on the depth of information available. FIG. 4 shows a flow diagram 400 of tactics 402, techniques 404, and procedures 406 where the tactic 402 uses a mechanism 403 for the technique 404 that is implemented 405 by the procedure 406 in this exemplary flow diagram.

The different levels of detail have different levels of data completeness, typically as the level of detail increases, the less complete the data becomes as illustrated in table 2:

TABLE 2

| Level | Coverage | Notes |
| --- | --- | --- |
| Tactics | Complete | Define Tactics as part of the standard taxonomy that is in use. In the case of Mitre ATT&CK Enterprise framework, examples of these are "Credential Access", "Initial Entry" and "Privilege Escalation". |
| Techniques | Complete | Define Techniques as part of the standard taxonomy, but unlike Tactics, they are more fluid and subject to change. As such, the standard taxonomies are extended so as to account for some techniques that real-world attacks have exploited. |

TABLE 2-continued

| Level | Coverage | Notes |
|---|---|---|
| Procedures | Minimal | Define Procedures as possible procedures for implementing a given technique. Procedures are a subject of ongoing research - both public and clandestine, by attackers, defenders, software vendors and security researchers. As such, reliance on procedures is difficult as a general mechanism for determining the probability of success, but the technology use them when performing 'what-if' analysis for replaying attacks that have happened and been forensically analyzed. |

For Techniques, the standard taxonomy typically trails the latest attack techniques due to editorial and verification processes rather than an inability for the taxonomy to support them. At the time that the taxonomy adequately described one of our extensions, the present technology reconciles the two and falls back to the standard taxonomy elements.

This hierarchy may be used to 'roll up' the probability to a higher level of abstraction, meaning that we can consider the totality of the information that we have access to, even if we only have partial information at a given level.

Where the technology of the present application is using Procedures as its Action source (which is not a normal mode of operation due both to the scale required and the sparseness of the available data), then the probability of success of a given Procedure may be experimentally tested against a representative configuration, a current, or proposed configuration (dependent on what information we have about the target network). Test harness systems exist to allow a person of ordinary skill in the art to automate testing of these procedures against real environments. Where a customer allows, the tests of the procedures may be against the target network's configuration. Otherwise, generic databases of tests against sample configurations of different commonly deployed operating system configurations are available.

Where the technology of the present application uses Tactics or Techniques as its Action source, a probability of success may be shown by FIG. 5 showing an exemplary flow diagram 500. Flow diagram 500 includes five (5) stages including apply defensive modifications to a lower level stage 502, replace blank entities with library values stage 504, aggregate lower level probabilities stage 506, apply configuration and vulnerability modifications stage 508, and perform final aggregation stage 510. The stages 502, 504, 506, 508, and 510 may be further defined as:

Apply defensive modifications to a lower level stage 502—this allows the technology of the present application to take into account the network's defenses at either the Technique or Procedure level. As an example, the technology of the present application may determine that a certain configuration of the operating system mitigates a specific procedure, or the technology of the present application may determine that the presence of a defensive application may block a collection of procedures and therefore significantly drop the aggregate probability of the technique being successful. Additionally, the technology of the present application may allow this at the technique level: by mapping the known security features of the network to the technique matrix, we can say that a particular security feature blocks or significantly reduces the probability of the technique being used successfully.

Replace blank entities with library values stage 504—where the technology of the present application does not have a sample of the network's specific configuration (for example a configured Operating System image to analyze, or a complete network topology) then the technology of the present application may use values from existing library for configurations that are believed to be close to the target network. While this is not as accurate as using customer-specific values, it allows the technology of the present application to operate without complete knowledge of the target network and still produce a realistic and justifiable probability. Where experiments either have not or cannot be performed, subject matter experts may provide this data.

Aggregate lower level probabilities stage 506—aggregating the probabilities at a lower level allows the technology of the present application to come up with a single probability for the success at the higher level. The technology of the present application aggregates the probabilities using standard mechanisms (weighted average, Monte Carlo simulation, etc.).

Apply configuration and vulnerability modifications stage 508—by applying information gathered about vulnerabilities (typically with CVEs) to the level that the model is operating at (CVEs map to techniques natively, but if there is an exploit for a CVE in the wild, that is counted as a Procedure for the technique.) The same is true for configuration settings—except that in this case rather than being a Procedure for the technique, the configuration setting may either increase or decrease the probability of a set of techniques succeeding as it may mitigate whole classes of Procedures or Techniques.

Perform final aggregation stage 510—if the technology of the present application is operating at a level below the Tactic level, the technology of the present application performs a final aggregation at the tactic level as discussed above in stage 506.

The probability of defense includes is derived by analyzing the defenses that exist on the target network. It is important to note that the "probability that the attack is defended" as discussed here is the probability that the attack is completely terminated by defenders when the attacker takes the jth action of the nth iteration. The probability that the step will fail, but the attack will not be halted is taken care of in the $P(S_j)$ calculation detailed above. The steps to determine the probability that the attack will be shut down by a given tactic are designed to represent the visibility of the Actions of the cyber-attack to certain defenses. Effectively, here the technology uses a metric that maps to the visibility of the action to the defender. As an example, running almost anything that performs the function of discovery will generate a signal that a defending system might latch onto and trigger an alarm. Discovery could take the form of network packets that would not look normal to a network anomaly detection system, or a series of file accesses that would look anomalous to an endpoint protection system. As with the $P(S_j)$ calculation, detection probability calculations can operate at either the Procedure, Technique or Tactic level. The procedure itself is similar to that for the $P(S_j)$ calculation and will not be further explained here but may be represented by flow diagram 600 shown in FIG. 6. Flow diagram 600 may be defined by five (5) phases including an apply signal modification to lower level phase 602, replace blank entities with library values phase, 604, aggregate lower level probabilities phase 606, apply defense modifications phase 608 and perform final aggregation phase 610. Each phase is further explained:

Apply signal modification to lower level phase 602—this applies the defenses that the customer has that might detect and flag a Procedure. This might include the detection of malware by an endpoint protection system, or an action that might trigger in an anomaly detection system Replace blank entities with library values phase 604—as with the P(Sj) calculation, if we do not have experimental values that represent the configuration in the target network, then we use values from our library of results for similar configurations Aggregate lower level probabilities phase 606—this step operates in the same way as the P(Sj) calculation Apply defense modifications phase 608—the defense modifications applied here refer to higher level defences and can include items such as personnel training, whether the company operates a SOC, presence of backups, maintains incident response plans, or maintains a disaster recovery plan for the company. These defenses operate above the individual endpoint and network level and so we apply them at the higher levels.

Perform final aggregation phase 610—this step operates in the same way as the P(Sj) calculation and will not be re-explained here.

Figure 7:
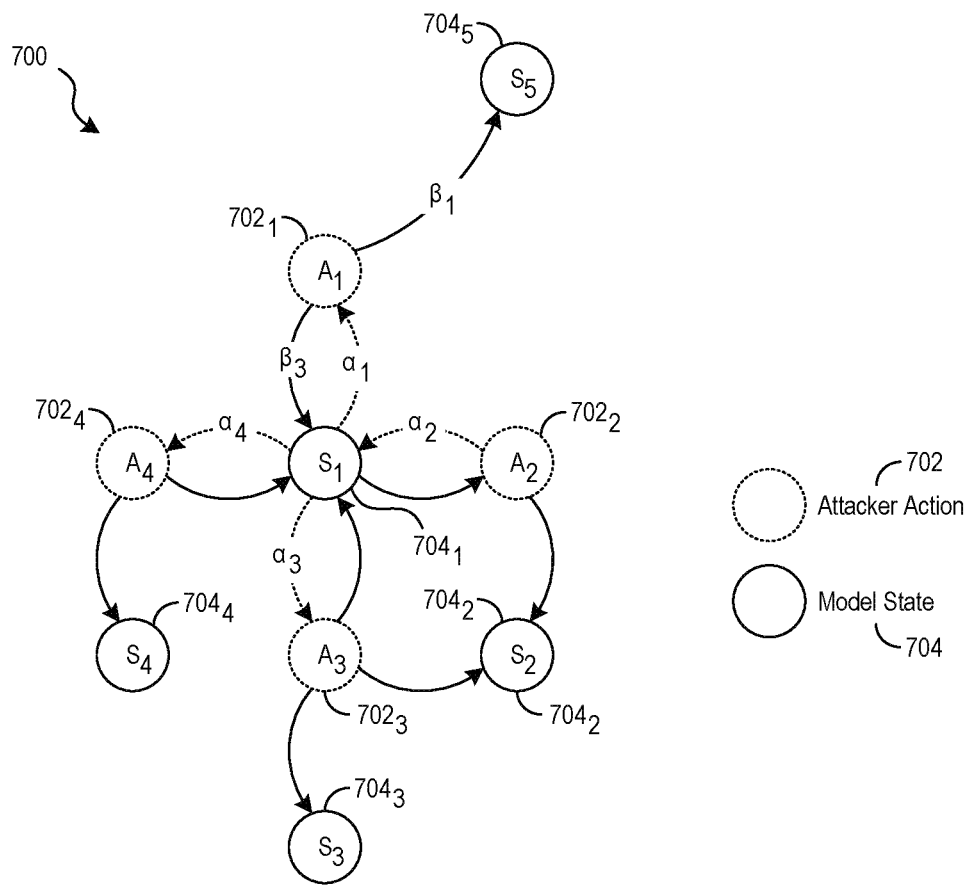
FIG. 7 shows a state diagram with attacker actions identified as actions and states of the network shown by states consistent with the technology of the present application.

The cyber-attack is dynamic and, in the simplest case, the attack stages may be thought of as a 'canned set' of Actions (Action 2, 3, 4, etc) that an attacker might take in pursuit of an objective (also called a success state). However, there is an extension that may be applied that allows us to have a dynamic set of attack stages for each iteration of the attack lateral movement function. The model used to achieve this use two state machine-based processes to model both the attacker and the defense of the network as shown in FIG. 7. FIG. 7 shows a state diagram 700 with attacker actions identified as actions A 702 and states of the network shown by states S 704. In this case, there are four (4) actions A 702, which are individually identified as Action $A_1$ 702$_1$, Action $A_2$ 702$_2$, Action $A_3$ 702$_3$, and Action $A_4$ 702$_4$. The state diagram further has five (5) states S 704 which are individually identified as state $S_1$ 704$_1$, state $S_2$ 704$_2$, state $S_3$ 704$_3$, states $S_4$ 704$_4$, and state $S_5$ 704$_5$.

The states depicted in FIG. 7 are representative of what the attacker can access, what the attacker can see (e.g. what about the target network has the attacker discovered as they move through the target network), what credentials the attacker possess or needs (local user, local or network administrator, network user, etc.). The attack lateral movement attempts to increase the access, knowledge, and credentials to facilitate the attack reaching the successful state. With this in mind, the technology of the present application considers the simulation to be completed successfully (from the attacker's perspective) when the attacker reaches a target state; which we define to be: (1) The attacker has discovered the endpoint that contains the target; (2) The attacker has discovered that the endpoint contains the target; (3) The attacker has access to the endpoint that contains the target; (4) The attacker has credentials that allow them to access the target; (5) or some combination thereof. Once these conditions are satisfied, the simulation is effectively over and the attack success probability is 100% as the successful state is reached. In this regard, we can think of our model as having significant similarities to an Absorbing Markov Chain based model. With every 'tick' of the network simulation, the attacker must perform one of the actions available to them from the current state. We may express this requirement mathematically as equation 8:

$$\Sigma_i P(\alpha_i) = 1 \qquad (8)$$

$\alpha$, in equation 8, corresponds to an available action from the attacker's current state. The technology of the present application may also require that every action has a consequence. That consequence may be to return to the initial state (no gain to the attacker), or it may be to move to any of the forward states connected to the action. In our example diagram, A1 is connected to S1 and S5. The consequence may be expressed mathematically as equation 9:

$$\Sigma_i P(\beta_i) = 1 \qquad (9)$$

Notice that even where there is no gain to the attacker, the cost (in terms of signal to the defender) will still have been incurred by performing the step, regardless of the result.

The technology of the present application now determines the availability and probability of the actions $\alpha$ by analyzing a data set of forensic analyses of attacks that have happened in history and where possible attributing them to the actors that perpetrated them. This data is available from public databases. The attribution data allows the assignment of different probabilities as to what actions will be chosen by different attackers and different attacker classes.

The technology of the present application, when categorizing likely or probably TTPs (tactics, technology, and procedures) of the attacker takes into account the attacker's motivation, the attacker's resource level, the attackers skill level, the attacker's patience (or time frame), and the attacker's level of risk aversion or acceptance.

The motivation of the attacker is representative of both what the attacker wants to achieve at a basic level (for example monetary gain, information gathering, or disruption) and the reason behind this aim (for example personal/corporate enrichment, nation-state activity, political dissatisfaction, influencing elections and politics, or service and infrastructure disruption). In general, the attacker persona may have more than one basic goal, but a single reason behind the aim.

The resource level of the attacker is representative of the tools that the hacker may have at their disposal. As an example, a well-resourced hacker (for example someone acting for, or funded by a nation-state) will have the capability to purchase or develop one or more zero-day attacks, and would conceivably have access to a large, skilled team of people to build malware artefacts and new attack procedures. By contrast, a less resourced hacker will likely not be able or willing to afford zero-day vulnerability information and may have to rely on publicly (either on the lit, or the dark web) available techniques and procedures.

The skill level of the attacker represents their capabilities at a technical level—higher skilled attackers can more easily perform difficult technical tasks, and typically have more stealth while doing so. The skill level can be related to their affiliation (for example unaffiliated, specific nation-state, organized crime) but also related to other factors that can govern the level of skill of the attacker.

The patience level of the attacker represents how much real time an attacker is likely to wait, for two ends—firstly so that they don't generate a cluster of 'signals' that defense systems might pick up on and correlate or govern the probability that they might use a technique that requires them to wait for a coincidence of events. As an example, a less patient attacker might cause situations that have the potential to generate larger signals to the defense, such as engineering a situation in which administrator credentials may be in memory rather than wait for those same credentials to surface organically.

The risk aversion (or acceptance) level of the attacker measures how cautious they will be. Risk Aversion is not an independent measurement of the attacker as in, for example, if they have a high resource level then they are not likely to mind "burning" expensive assets. A more skilled attacker is more likely to understand what poses a risk (in that it leaves footprints and sends signals that could be picked up by a defense) and is therefore less likely to risk performing actions that might lead to an increased likelihood to be caught. As a very simple example, if there is a vulnerability that relies on a specific arrangement of memory to work, and in the case where it does not work there is a chance of causing a system crash, then a risk-averse attacker is less likely to take that course of action for fear of being detected.

The technology of the present application takes into account different actor classes as well. Specifically, different actor classes have different magnitudes of consequence for being caught. Whereas an attacker representing organized crime may face prosecution, or asset seizure a nation state sponsored hacker risks far more. For example, a nation-state sponsored hacking group being directly implicated could result in an international diplomatic incident, an international witch hunt, or even directly military response in the worst cases.

With reference back to equation 9, the probabilities of the results of actions, β, are determined as before—they are the probability of an action providing a transition to another state and map to the P(Sj) terms discussed previously. The difference, in this case, is that we select the j+1th action from the available actions for the current state. Defining the action probabilities in this manner allows us to factor in a more diverse range of tactics and techniques, and also apply a degree of intelligence to the simulated attacker—for example where the attacker already possesses network credentials, they do not need to perform a Credential Access technique, and so this will be omitted from subsequent iterations by setting its probability to 0. Each action, successful or not, also carries with it a cost—that cost is the equivalent of the visibility of the action in the static model described previously.

Figure 8:
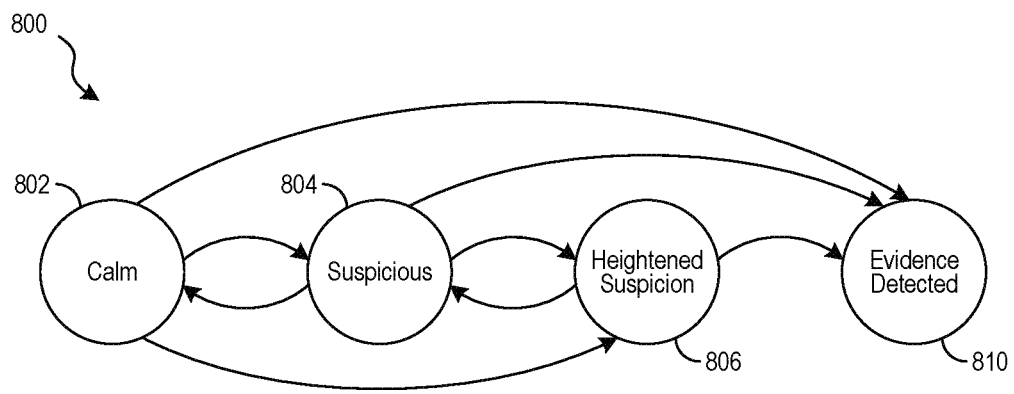
FIG. 8 shows exemplary response or defense states and configurations of a target network consistent with the technology of the present application.

The defense configuration of the target network runs with or in parallel with the attacker model just described. As each time interval (or tick of the clock) occurs, an attacker action may be detected by the target network's defenses. FIG. 8 shows that the target network 800 may operate in different alertness states including a calm state 802, a suspicious state 804, a heightened suspicion state 806, and an evidence of attack detected state 808, of course more or less states are possible. The calm state 802 is when the target network has no evidence that there is an attack ongoing. Normal surveillance operations and settings are in effect, but there is no specific threat that the target network is attempting to detect or monitor. The suspicious state 804 provides that there is no specific indications that an attack is ongoing, but they are more vigilant than normal and the defense systems of the target network may pay more attention to signals that happen in the monitoring systems. In this case, it would take a lower level of noise for them to detect that an attack is ongoing. The heightened suspicion state provides that the target network is now looking for a specific attack that is ongoing although the specific attack or action on objective may not be known. Being in a state of heightened suspicious means that they are far more sensitive to signals generated by actions. The evidence of attack detected state 808 provides the defenses of the target network have detected the attack and have begun remediation efforts. If the defender reaches this stage, then the probability of detection is set at 1, and the attack is effectively over. As shown by the interconnecting arrows, the defense systems of the target network can escalate to any state upstream from present state. For example, the target network can move from the calm state 802 to the heightened suspicion state 806 without moving to the suspicion state 804. However, most defense configurations of target networks only allow step decreases in state in the downstream direction. Thus, to move from heightened suspicion state 806 back to calm state 802, the target network must spend time in the suspicion state 804.

The signal level for a given interval of time t, or tick, is provided by equation 10:

$$n_t = \frac{n_{t-1}}{(d + a_p)} + n_{a_x} \qquad (10)$$

Where $n_t$ is the signal level at the time interval t. d is the decay constant that controls how quickly the noise level decays naturally. $a_p$ is an adjustment to the decay constant based on the current attacker persona (as described above). $n_{ax}$ is the signal generated by action $a_x$. $n_0$, the signal at time interval (or tick) 0, is set to 0 so that the defense system is in its lowest state of awareness at the inception of the attack. Next, for each state that the defense can be in, the technology of the present application defines thresholds at which they will move to other states including: $I_+$ – the threshold in which they move to the next state up; $I_{++}$ – the threshold in which they would move two states up (if available); $I_{+++}$ – the threshold in which they would move three states up (if available); and $I_-$ —the threshold in which they move to the state beneath the current state. In the technology of the present application, d is controlled by the configuration of defenses at both the corporate level and at the technical level. The greater the defenses, the slower the signal decay happens. $a_p$ is controlled by a combination of the facets of an attacker that have already been described. Also, the thresholds are derived from the defense configuration of the network and customer profile of the target network. Customers with more monitoring equipment, more staff and dedicated defense departments will have lower thresholds than customers who do not pay attention to as many signals.

As mentioned above, the technology of the present application operates on a time interval or tick basis. With the lapse of every time interval or tick of the attack, an attacker selects an action, the system evaluates the probabilities, and an action is selected. The action is then evaluated based on probabilities, and the signal level that is a result is added to the defense alert level equation. With this information, the probability P(St)—the probability that the attack is still viable at time interval, or tick, t—is evaluated. The technology of the present application then evaluates the following questions which are required to terminate the simulation: (1) Has the maximum defensive level been achieved (Evidence Detected)? (2) Has the probability of the attack succeeding gone to 0 (i.e. have there been enough iterations that we are sure the attacker would have been detected regardless of the defense alert status)? (3) Has the maximum number of iterations been reached (this corresponds to n in the probability equation)? (4) Each of these conditions results in an attack failed result. If the answer to these questions is all no, the system then evaluates if the state that the attacker finds itself in constitutes a successful attack (by our previous definition). If it does, then the attack is marked as successful. If all four of these conditions evaluate to no, then the attack moves on to the next iteration and starts the process again.

Figure 9:
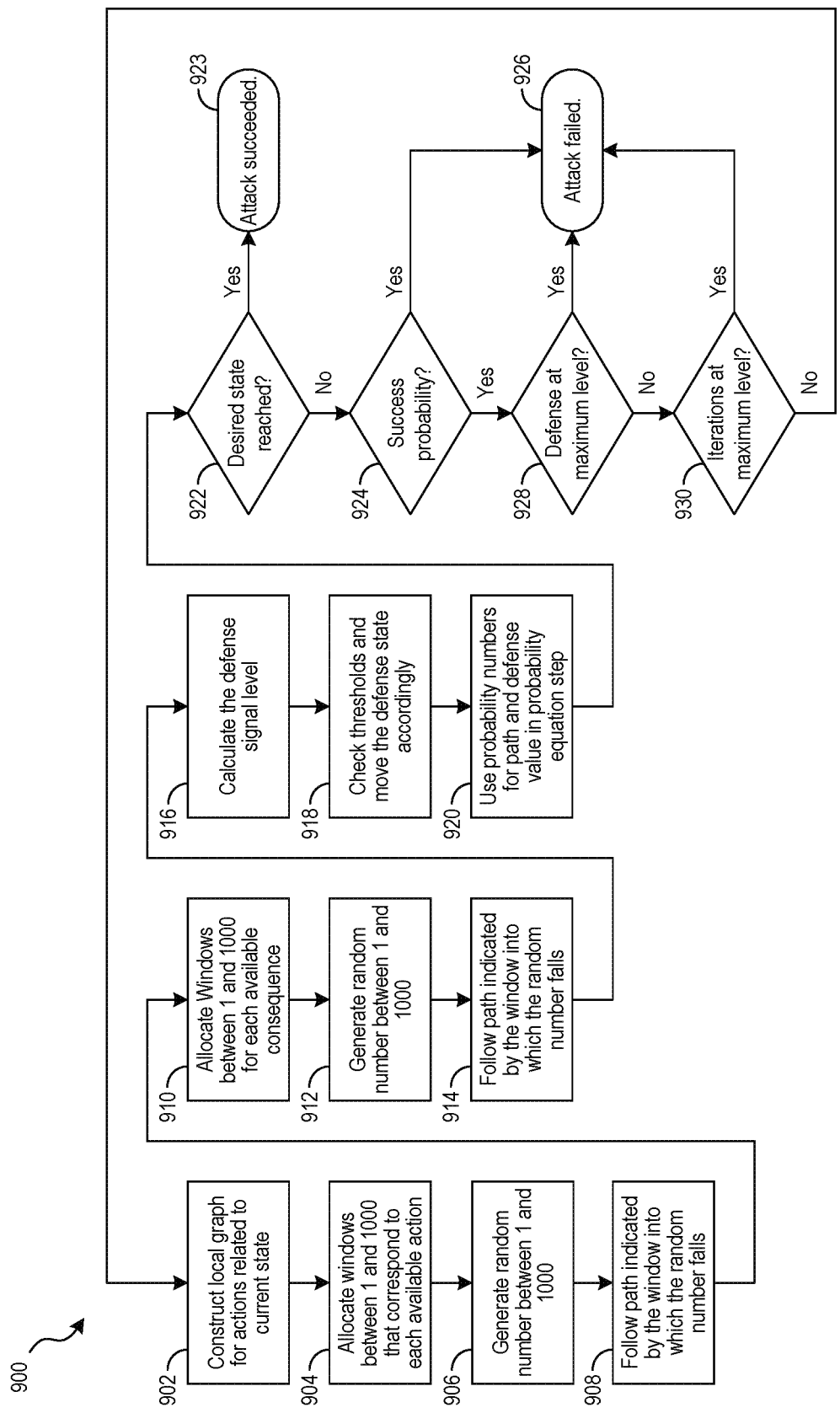
FIG. 9 is an exemplary flow diagram of a methodology illustrative of determining the probability of success for a cyber-attack consistent with the technology of the present application.

FIG. 9 shows an exemplary flow cart 900 implementing the process as described herein. The flow chart 900 is shown as a continuous loop as the process is iterative. For purposes of the explanation here, the process may be considered to start at step 902 where a local graph for actions related to the current state of the target network is constructed. Windows are next allocated between 1 and 1000 (or some other defined upper limit) that correspond to each of the actions in step 902, step 904. A first random number is generated between 1 and 1000 (or the upper limit), step 906. The target network takes the action indicated for the time interval, or is next moved by the time interval increment over the path, indicated by the window into which the random number falls, step 908. The technology of the present application next allocates windows between 1 and 1000 (or the upper limit) for available consequences of the action followed in step 908, step 910. A second random number is generated between 1 and 1000 (or the upper limit), step 912. The technology of the present application applies the consequence (or follows the path) of the window into which the random number falls, step 914. The technology of the present application, based on the action and consequence, calculates the defense signal of the target network, step 916, and checks thresholds to determine if the defense of the target network should be changed, step 918. The technology uses the probability numbers of the action path and the consequence defense value in the probability equations described above, step 920. Although the example herein provides an arbitrary large number of 1000 windows, the windows may be more or less. In still other embodiments, each action may have a unique number from 1 to the total number of actions. In this example, the arbitrary large number of 1000 would be replaced by the total number of actions.

Next, the technology of the present application determines whether the action on objective was achieved, or was the success state reached, step 922, at which case the probability of success is 100% because the attack was successful, step 923. If the action on objective was not achieved, the technology next determines whether the success probability was calculated to be zero (0), step 924. If the success probability is zero (0), the attack fails, step 926. If the success probability is NOT zero (0), the technology of the present application next determines is the defense configuration of the target network is at the evidence of attack detected state 808, step 928. If the defense configuration is determined to be at the evidence of attack detected state 808, the attack fails, step 926. If the defense configuration is NOT at the evidence of attack detected state 808, the technology of the present application next determines whether the maximum number of iterations (or lateral movement options) has been reached, step 930. If the maximum number of iterations has been reached, the attack fails, step 926. Otherwise the target network enters the next state and the process repeats at step 902. The maximum number of iterations is generally different for different target networks. The maximum number of iterations may be based on, for example, the number of endpoints in the target network, the number of employees having access to the target network, the number of security compartments in the target network, and the like, or some combination thereof. Generally, the maximum number of iterations will range between about 10 and 1000.

The technology of the present application runs the attack simulations potentially 10's of thousands of times per attacker persona to generate a statistically significant distribution of the probability of success for that attacker persona when pitted against the model of the network that we have.

Figure 10:
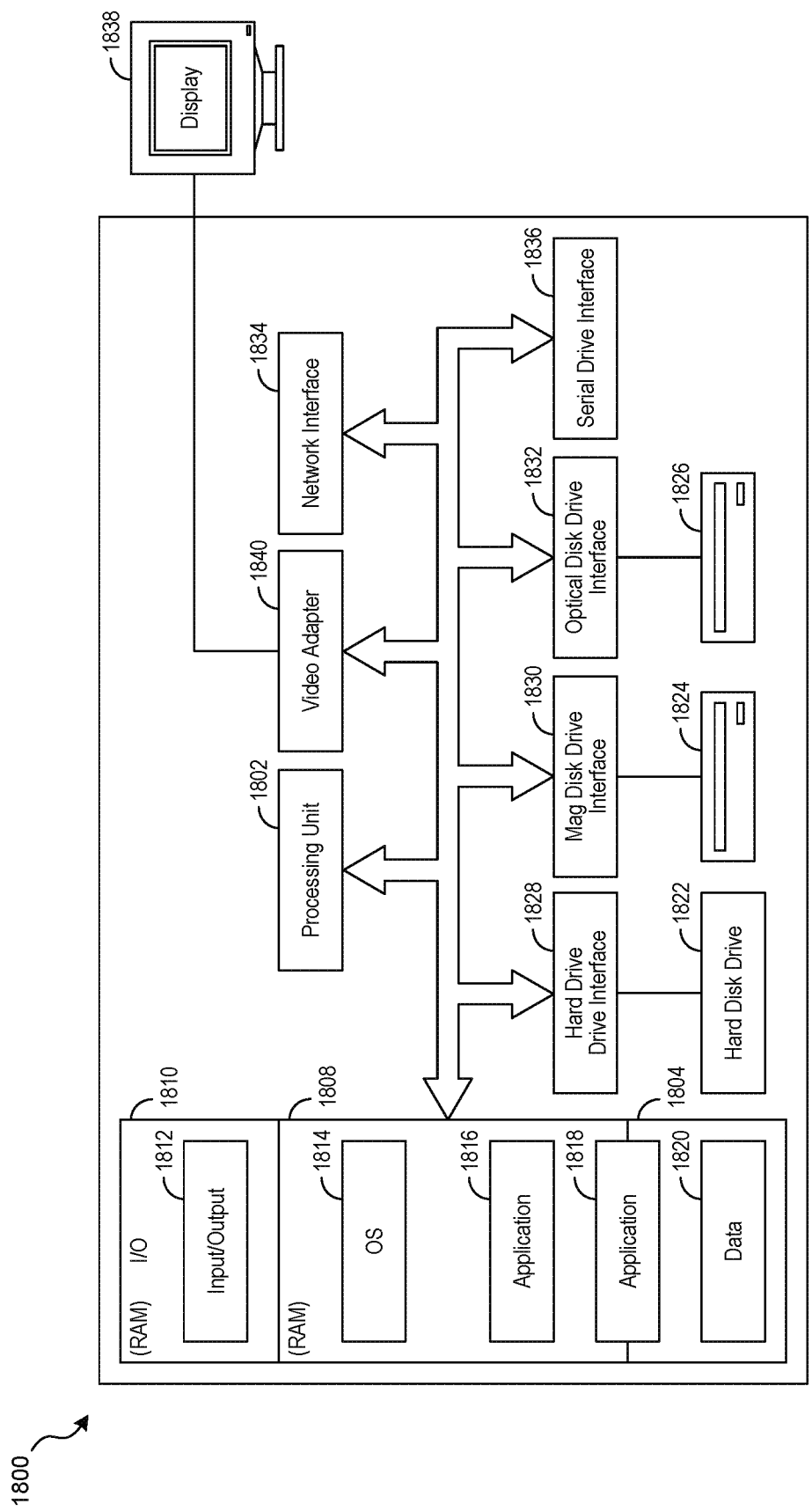
FIG. 10 is a functional block diagram of a device on which the technology of the present application may be implemented.

Referring now to FIG. 10, a functional block diagram of a typical client device 1800 for the technology of the present application is provided. Client device 1800 is shown as a single, contained unit, such as, for example, a desktop, laptop, handheld, or mobile processor, but client device 1800 may comprise portions that are remote and connectable via network connection such as via a LAN, a WAN, a WLAN, a Wi-Fi Network, Internet, or the like. The client device 1800 could be associated with a desktop computer, a server, a server farm, or other processing devices. Generally, client device 1800 includes a processor 1802, a system memory 1804, and a system bus 1806. System bus 1806 couples the various system components and allows data and control signals to be exchanged between the components. System bus 1806 could operate on any number of conventional bus protocols. System memory 1804 generally comprises both a random access memory (RAM) 1808 and a read only memory (ROM) 1810. ROM 1810 generally stores a basic operating information system such as a basic input/output system (BIOS) 1812. RAM 1808 often contains the basic operating system (OS) 1814, application software 1816 and 1818, and data 1820. System memory 1804 contains the code for executing the functions and processing the data as described herein to allow the present technology of the present application to function as described. Client device 1800 generally includes one or more of a hard disk drive 1822 (which also includes flash drives, solid state drives, and etc. as well as other volatile and non-volatile memory configurations), a magnetic disk drive 1824, or an optical disk drive 1826. The drives also may include zip drives and other portable devices with memory capability. The drives are connected to the bus 1806 via a hard disk drive interface 1828, a magnetic disk drive interface 1830 and an optical disk drive interface 1832, etc. Application modules and data may be stored on a disk, such as, for example, a hard disk installed in the hard disk drive (not shown). Client device 1800 has network connection 1834 to connect to a local area network (LAN), a wireless network, an Ethernet, the Internet, or the like, as well as one or more serial port interfaces 1836 to connect to peripherals, such as a mouse, keyboard, modem, or printer. Client device 1800 also may have USB ports or wireless components, not shown. Client device 1800 typically has a display or monitor 1838 connected to bus 1806 through an appropriate interface, such as a video adapter 1840. Monitor 1838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method performed on a processor of determining a probability of success of a cyber-attack on a target network to evaluate one or more defenses of the target network, the method comprising:
   calculate a probability that the cyber-attack will successfully ingress to the target network wherein the cyber-attack is a dynamic, multi-stage attack;
   generate, for each stage of the dynamic, multi-stage attack, an iterative lateral movement function for lateral movement of the cyber-attack through the target network;
   calculate, for each stage of the dynamic, multi-stage attack, using the iterative lateral movement function a probability that the cyber-attack will successfully move laterally in the target network by performing an action;
   generate, for each stage of the dynamic, multi-stage attack, a probability that the cyber-attack will successfully perform an action on objective;
   calculate, for each stage of the dynamic, multi-stage attack, the probability that the cyber-attack will be successful by combining the probability that the cyber-attack will successfully ingress, the probability that the cyber-attack will successfully move laterally, and the probability that the cyber-attack will successfully perform an action on objective such that the one or more defenses of the target network may be evaluated; and
   apply, for each stage of the dynamic, multi-stage attack, the one or more defenses of the target network based on one or more of the calculated probabilities,
   wherein the probability that the cyber-attack will successfully ingress to the target network is set to 100% for subsequent attacks of the dynamic, multi-stage attack, and the method further comprises:
   applying signal modifications to one or more defenses at a lower level;
   replacing blank entities with library values for configurations that relate to the target network;
   aggregating lower level probabilities to produce a single probability for the success at a higher level;
   applying defense modifications based on the single probability for the success at the higher level; and
   performing final aggregation at the higher level, and
   wherein the one or more defenses of the target network applied based on one or more of the calculated probabilities improves the successful implementation of cyber security countermeasures against dynamic, multi-stage attacks on the target network.

2. The method of claim 1, wherein calculating using iterative lateral movement function comprises:
   calculating $$f_{lateral} = \Pi_{n=0}^{iterations} \Pi_j^{stages}((P(S_j)+(1-P(S_j)) \times f_d(n)) \times ((1-P(d_j) \times f_a(n))))$$

where j represents each stage of the cyber-attack, n represents the iteration that the cyber-attack is going through to move laterally, $f_d(n)$ is a damping function that represents the increasing knowledge of the cyber-attack at the nth iteration, $P(S_j)$ is the probability that a given action will succeed, $P(d_j)$ is the probability that the network's defenses will detect the action for the $j^{th}$ stage in the $n^{th}$ iteration, and $f_a(n)$ is an amplification function that represents the increasing likelihood that the one or more defenses of the target network will detect and stop the attack.

3. The method of claim 2 wherein the amplification function increases the likelihood that the one or more defenses of the target network will detect and stop the attack based on the alertness state of the target network.

4. The method of claim 3 wherein the alertness state comprises a calm state, a suspicious state, a heightened suspicion state, and an evidence of attack detected state.

5. The method of claim 4 wherein the attack fails when the alertness state is the evidence of attack detected state.

6. The method of claim 1 wherein calculating a probability that the cyberattack will successfully ingress to the target network comprises multiplying the probability of an action 0 being successful and an action 1 being successful.

7. The method of claim 1 wherein the plurality of available actions corresponds to the plurality of states to which the target network can be configured from a present state of configuration.

8. The method of claim 7 wherein the plurality of action has a corresponding plurality of consequences moving the target network to at least one of the present state of configuration or a new state of configuration.

\* \* \* \* \*